(12) United States Patent
Martin et al.

(10) Patent No.: US 12,471,512 B2
(45) Date of Patent: Nov. 18, 2025

(54) CONTROL SYSTEM FOR ADJUSTING HEADER SEGMENTS OF AN AGRICULTURAL HEADER BASED ON MEASUREMENTS

(71) Applicant: CNH Industrial America LLC, New Holland, PA (US)

(72) Inventors: Jethro Martin, Ephrata, PA (US); Cory Douglas Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 629 days.

(21) Appl. No.: 17/912,157

(22) PCT Filed: Mar. 16, 2021

(86) PCT No.: PCT/US2021/022505
§ 371 (c)(1),
(2) Date: Sep. 16, 2022

(87) PCT Pub. No.: WO2021/188501
PCT Pub. Date: Sep. 23, 2021

(65) Prior Publication Data
US 2023/0146866 A1 May 11, 2023

Related U.S. Application Data

(60) Provisional application No. 62/990,258, filed on Mar. 16, 2020.

(51) Int. Cl.
*A01B 63/10* (2006.01)
*A01B 63/00* (2006.01)
(Continued)

(52) U.S. Cl.
CPC ............ *A01B 63/10* (2013.01); *A01B 63/008* (2013.01); *A01D 41/127* (2013.01);
(Continued)

(58) Field of Classification Search
CPC .... A01B 63/10; A01B 63/008; A01D 41/127; A01D 41/141; F15B 11/08;
(Continued)

(56) References Cited

U.S. PATENT DOCUMENTS 5,359,836 A * 11/1994 Zeuner ................. A01D 41/141
56/208
5,471,825 A 12/1995 Panoushek et al.
(Continued)

FOREIGN PATENT DOCUMENTS

AU 2008200792 B2 * 11/2012 ........... A01D 41/141
EP 3456174 B1 * 7/2021 ........... A01B 63/008
(Continued)

OTHER PUBLICATIONS

International Search Report and Written Opinion for PCT Application No. PCT/US2021/022505 dated Jun. 14, 2021 (24 pages).

*Primary Examiner* — Arpad Fabian-Kovacs
(74) *Attorney, Agent, or Firm* — Buchanan Ingersoll & Rooney PC

(57) ABSTRACT

An agricultural system includes a header including a first header segment and a second header segment. The agricultural system also includes an actuator configured to adjust a position of the first header segment relative to the second header segment. The agricultural system also includes a controller configured to receive sensor information from a pressure sensor and compare the pressure to a threshold pressure. The sensor information may be indicative of a pressure within a cylinder of the actuator. The controller may be configured to send instructions to the actuator to adjust the first header segment relative to the second header segment in response to the pressure being below the pressure threshold.

18 Claims, 4 Drawing Sheets

(51) Int. Cl.
*A01D 41/127* (2006.01)
*A01D 41/14* (2006.01)
*F15B 11/08* (2006.01)
*F15B 13/04* (2006.01)
*F15B 13/044* (2006.01)

(52) U.S. Cl.
CPC ............ *A01D 41/141* (2013.01); *F15B 11/08* (2013.01); *F15B 13/0401* (2013.01); *F15B 13/044* (2013.01); *F15B 2211/426* (2013.01); *F15B 2211/526* (2013.01)

(58) Field of Classification Search
CPC ................ F15B 13/0401; F15B 13/044; F15B 2211/426; F15B 2211/526
See application file for complete search history.

(56) References Cited

U.S. PATENT DOCUMENTS

| | | | |
|---|---|---|---|
| 5,704,200 A * | 1/1998 | Chmielewski, Jr. | ............................ A01D 41/141 56/DIG. 15 |
| 7,191,582 B2 * | 3/2007 | Bomleny | ............ A01D 41/141 56/10.2 E |
| 7,430,846 B2 * | 10/2008 | Bomleny | ............ A01D 41/141 56/10.2 E |
| 7,540,130 B2 | 6/2009 | Coers et al. | |
| 7,661,251 B1 * | 2/2010 | Sloan | .................... A01D 41/145 60/413 |
| 7,707,811 B1 * | 5/2010 | Strosser | ............ A01D 41/141 56/10.2 E |
| 9,198,349 B2 | 12/2015 | Ritter et al. | |
| 9,668,412 B2 | 6/2017 | Ritter et al. | |
| 9,968,033 B2 * | 5/2018 | Dunn | ................... A01B 63/008 |
| 10,455,764 B2 | 10/2019 | Noll et al. | |
| 11,369,059 B2 * | 6/2022 | Hunt | ................. A01D 41/141 |
| 11,375,654 B2 * | 7/2022 | Vandeven | ............ A01D 75/287 |
| 11,744,178 B2 * | 9/2023 | Hunt | ....................... A01D 41/06 56/10.2 R |
| 2010/0043368 A1 | 2/2010 | Sloan et al. | |
| 2018/0255706 A1 * | 9/2018 | Smith | ................... A01D 41/14 |
| 2019/0003496 A1 * | 1/2019 | Hunt | ....................... A01B 63/10 |
| 2019/0082598 A1 | 3/2019 | Seiders, Jr. | |
| 2019/0230857 A1 * | 8/2019 | Thomson | ............ A01D 41/141 |
| 2021/0185880 A1 * | 6/2021 | Martin | ................. A01D 41/141 |

FOREIGN PATENT DOCUMENTS

| | | |
|---|---|---|
| WO | 2019/113672 A1 | 6/2019 |
| WO | 2020/101886 A1 | 5/2020 |

* cited by examiner

CONTROL SYSTEM FOR ADJUSTING HEADER SEGMENTS OF AN AGRICULTURAL HEADER BASED ON MEASUREMENTS

BACKGROUND

The present disclosure relates generally to an agricultural vehicle and, more specifically, to an agricultural vehicle with a header having a control system.

A harvester may be used to harvest crops, such as barley, beans, beets, carrots, corn, cotton, flax, oats, potatoes, rye, soybeans, wheat, or other plant crops. During operation of the harvester, the harvesting process may begin by removing a portion of a plant from a field using a header of the harvester. The header may cut the plant and transport the cut crops to a processing system of the harvester.

Certain headers include a cutter bar assembly configured to cut a portion of each crop (e.g., a stalk), thereby separating the cut crop from the soil. The cutter bar assembly may extend along a substantial portion of a width of the header at a forward end of the header. The header may also include one or more belts positioned behind the cutter bar assembly relative to a direction of travel of the harvester. The belt(s) are configured to transport the cut crops to an inlet of the processing system.

Certain headers may also include a reel assembly, which may include a reel having multiple fingers extending from a central framework. The central framework is driven to rotate, such that the fingers move in a circular pattern. The fingers are configured to engage the crops, thereby preparing the crops to be cut by the cutter bar assembly and/or urging the cut crops to move toward the belt(s). The reel is typically supported by multiple arms extending from a frame of the header. The reel assembly may include one or more actuators configured to drive the arms to rotate, thereby adjusting the position of the reel relative to the frame of the header.

BRIEF DESCRIPTION

In certain embodiments, an agricultural system includes a header including a first header segment and a second header segment. The agricultural system also includes an actuator configured to adjust a position of the first header segment relative to the second header segment. The agricultural system also includes a controller configured to receive sensor information from a pressure sensor and compare the pressure to a threshold pressure. In some embodiments, the sensor information is indicative of a pressure within a cylinder of the actuator. In certain embodiments, the controller is configured to send instructions to the actuator to adjust the first header segment relative to the second header segment in response to the pressure being below the pressure threshold.

In certain embodiments, a control system includes a controller. In some embodiments, the controller configured to receive a set of sensor information from a set of sensors associated with a segment of a header. In certain embodiments, the set of sensor information is associated with a deflection measurement of the segment of the header, a load measurement of the segment of the header, a pressure measurement of an actuator associated with the segment of the header, or any combination thereof. In some embodiments, the controller is also configured to receive a set of conditions, the set of conditions comprising a set of soil conditions, a set of header conditions for an agricultural system, a set of crop conditions, or any combination thereof.

In some embodiments, the controller is also configured to determine a threshold pressure associated with the actuator, a threshold load associated with the segment, a threshold deflection associated with the segment, or any combination thereof based on the set of conditions. In some embodiments, in response to determining the set of sensor information falls below at least one of the threshold pressure, the threshold load, or the threshold deflection, the controller is configured to control the actuator associated with the segment of the header to move the segment of the header relative to another segment of the header.

In certain embodiments, a non-transitory computer readable medium includes executable instructions that, when executed by a processor, are configured to cause the processor to receive a set of conditions, the set of conditions including a set of soil conditions, a set of header conditions for an agricultural system, a set of crop conditions, or any combination thereof. In some embodiments, the non-transitory computer readable medium also includes executable instructions that, when executed by the processor, are configured to cause the processor to determine a threshold pressure based on the set of conditions and compare a pressure within a cylinder of an actuator associated with a segment of a header corresponding to the agricultural system to the threshold pressure. In certain embodiments, the non-transitory computer readable medium also includes executable instructions that, when executed by the processor, are configured to cause the processor to, in response to determining the pressure falls below the threshold pressure, provide a control signal to the actuator to move the segment of the header relative to another segment of the header.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
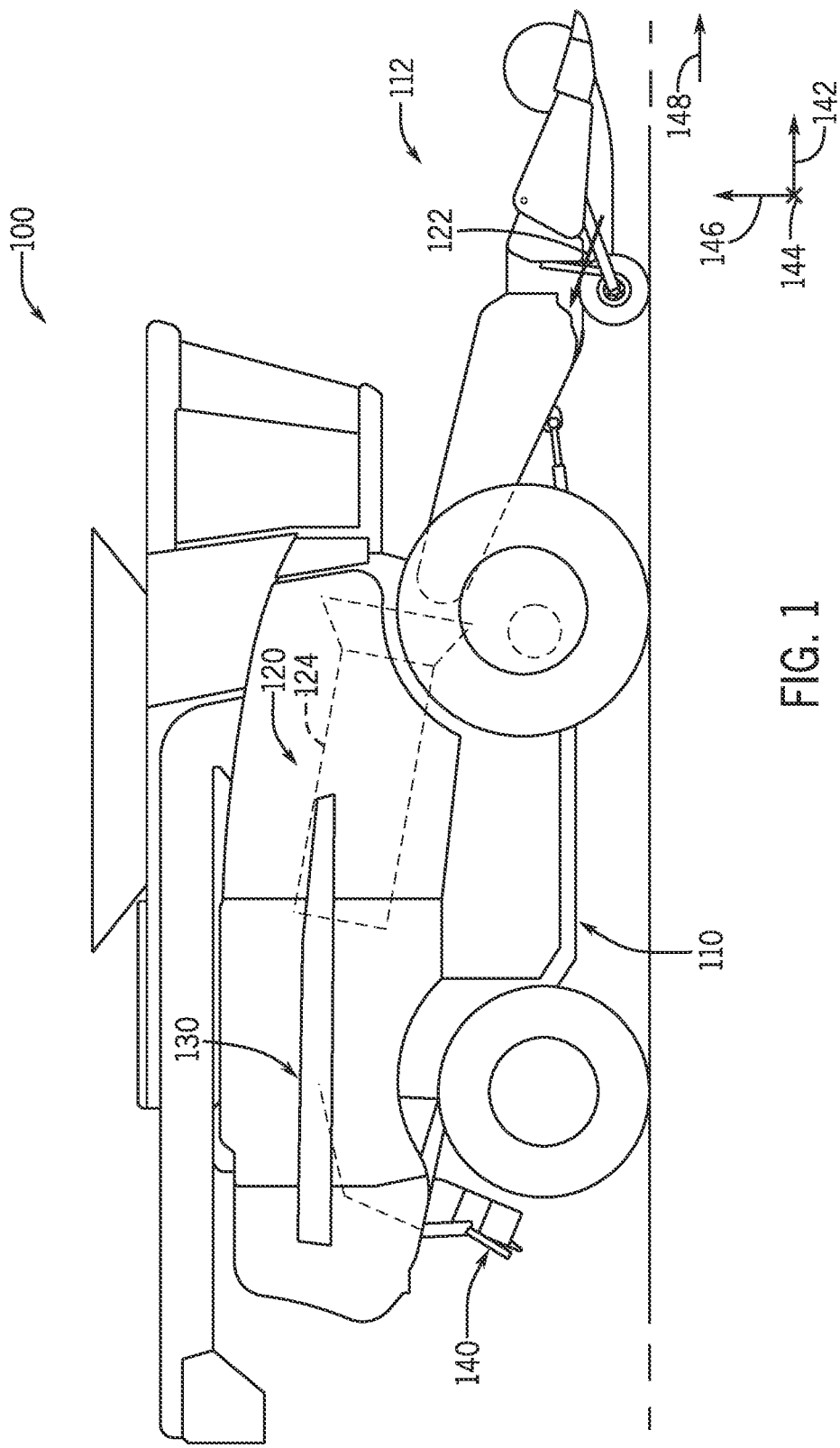
FIG. 1 is a side view of a harvester, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The process of farming typically begins with planting seeds within a field. Over time, the seeds grow and eventually become harvestable crops. Typically, only a portion of each crop is commercially valuable, so each crop is harvested to separate the usable material from the remainder of the crop. For example, a harvester may cut agricultural crops within a field via a header. The header may also gather the cut agricultural crops into a processing system of the harvester for further processing. The processing system may include a threshing machine configured to thresh the agricultural crops, thereby separating the crops into certain desired agricultural materials, such as grain, and material other than grain (MOG). The desired agricultural materials may be sifted and then accumulated into a tank. When the tank fills to capacity, the materials may be collected from the tank. The MOG may then be discarded from the harvester (e.g., via a spreader).

The header may cut crops from the field that are encompassed within a width of the header. The header may include a cutter bar assembly that extends along at least a portion of the width of the header, and the cutter bar assembly may use blades to cut the crops. The cut crops may fall onto the header, and the cut crops may be gathered together, such as via belt(s) that run across the header. The gathered agricultural crops may then be transported into the processing system of the harvester.

Certain harvesters may be configured to use a header having a segmented frame that may more closely follow contours of the field. Some headers may include a main section of the header which couples to one or more wing sections. While widening the header allows for fewer passes to completely harvest the field, several challenges are presented by the increased width of the header. As the header becomes wider, more ground irregularity compensation may be desirable to allow the header to consistently follow the ground due to many fields having significant ground deviation across the width of the header.

Turning now to the drawings, FIG. 1 is a side view of a harvester 100 (e.g., agricultural harvester). The harvester 100 includes a chassis 110 that supports harvesting apparatus to facilitate harvesting crops. As described in greater detail below, the harvester 100 also includes a header 112 (e.g., agricultural header, small grain header) that cuts crops and directs the cut crops in a direction 122 toward an inlet of a crop processing system 120 of the harvester 100 for further processing of the cut crops. The crop processing system 120 receives the cut crops from the header 112. As an example, the crop processing system 120 includes a thresher 124 that conveys a flow of crops through the crop processing system 120. In some embodiments, the thresher 124 includes a cylindrical threshing rotor that transports the crops in a helical flow path. In addition to transporting the crops, the thresher 124 may also separate certain desired crop material (e.g., grain) from residue (e.g., MOG), such as husk and pods, and direct the residue into a cleaning system located beneath the thresher 124. The residue may be transported to a crop residue handling system 130, which may hold the crop residue for further processing and/or may expel the crop residue from the harvester 100 via a crop residue spreading system 140 positioned at the aft end of the harvester 100. To facilitate discussion, the harvester 100 and/or its components may be described with reference to a longitudinal axis or direction 142, a lateral axis or direction 144, and a vertical axis or direction 146. The harvester 100 and/or its components may also be described with reference to a direction of travel 148 (e.g., along the longitudinal axis 142).

Figure 2:
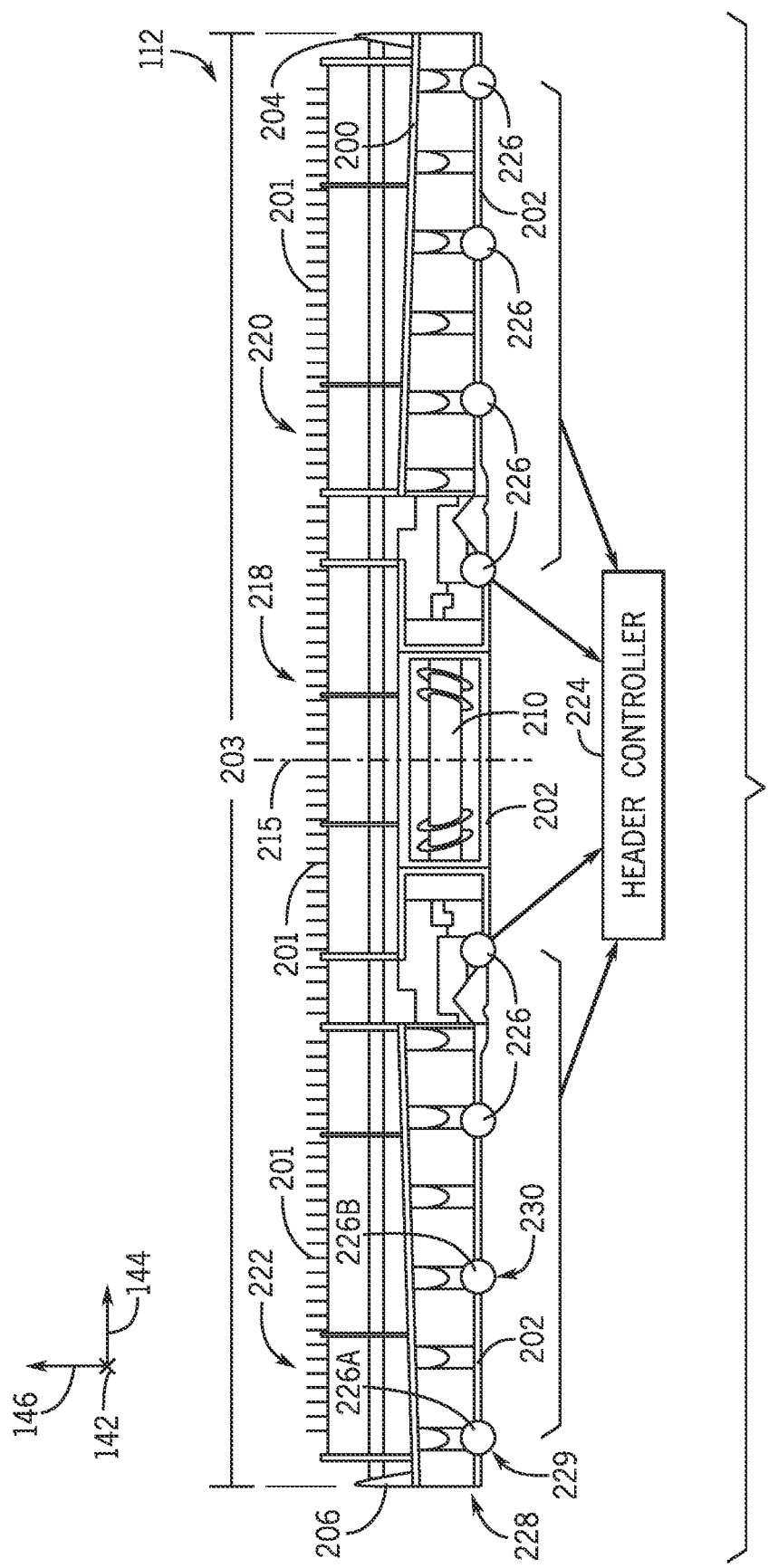
FIG. 2 is a rear view of a header that may be employed by the harvester of FIG. 1, in accordance with an embodiment of the present disclosure.

FIG. 2 is a rear view of the header 112 that may be used by the harvester 100 of FIG. 1. The header 112 includes a frame 200 that may be removably coupled to the harvester. The header 112 also includes a reel 201 and a cutter bar assembly 202 that extends across a width 203 (e.g., along the lateral axis 144) of the frame 200 between side portions 204, 206 of the frame 200. When the harvester 100 is in operation, the reel 201 may engage the crops to prepare the crops to be cut by the cutter bar assembly 202, and blades of the cutter bar assembly 202 may engage and cut the crops. The portions of the crops that are cut are transported to the crop processing system via an inlet 210 of the header 112. For example, in some embodiments, the header 112 may have one or more belts configured to direct the cut crops toward the inlet 210 to be delivered to the crop processing system.

The header 112 may be a segmented header, which may be flexible across the width 203. In other words, various sections of the header 112 along the width 203 may be adjustable relative to one another, such as movable relative to the vertical axis 146 (e.g., to raise and/or lower relative to one another). Thus, the shape of the header 112 may be adjustable so as to conform to a contour or profile of the field, thereby enabling the header 112 to cut crops more effectively (e.g., cut a greater amount of the crops). The header 112 includes a center segment 218, a first header segment 220, and a second header segment 222 in the illustrated embodiment, but the header may include any number of header segments (e.g., two, four, five, six or more) in alternative embodiments. The respective heights of the center segment 218, the first header segment 220, and the second header segment 222 may be adjustable (e.g., rotatable) relative to one another. For instance, the first header segment 220 and the second header segment 222 may each be pivotally coupled to opposite ends (e.g., lateral ends) of the center segment 218, and a position of the first header segment 220 relative to the center segment 218 may be independent of a position of the second header segment 222 relative to the center segment 218. That is, a position of the first header segment 220 may move (e.g., pivot) about the center segment 218 independently of movement of the second header segment 222. In the illustrated embodiment, the segments 218, 220, 222 each include a respective reel 201 and cutter bar assembly 202, but in additional or alternative embodiments, the segments may each share the same reel and/or cutter bar assembly that may each be flexible to accommodate movement of the segments relative to one another. In any case, adjustment of the segments 218, 220, 222 relative to one another may enable the cutter bar assembly or assemblies 202 to cut the crops more desirably.

The header 112 may be communicatively coupled to a header controller 224. In an example, the header controller 224 may be supported on the header 112. In some embodiments, the header controller 224 may be configured to adjust the header 112 relative to the chassis and/or may be configured to move the first header segment 220 and/or the second header segment 222 relative to one another and the center segment 218. The header controller 224 may be communicatively coupled to a set of sensors 226 and may be configured to move the first header segment 220 and/or the second header segment 222 relative to the center segment 218 based on readings made by the set of sensors 226.

In the illustrated embodiment, the header controller 224 is configured to operate based on readings from eight of the set of sensors 226. By way of example, a first sensor 226A of the set of sensors 226 may detect a first value indicative of a height (e.g., relative to a field) of a first header section 229 (e.g., of the second header segment 222), and a second sensor 226B, which is adjacent to the first sensor 226A, may detect a second value indicative of a height (e.g., relative to the field) of a second header section 230 (e.g., of the second header segment 222) adjacent to the first header section 229.

In certain embodiments, at least one of the set of sensors 226 may include a pressure sensor (e.g., cylinder pressure sensor) that is configured to monitor a pressure within a cylinder of a piston and cylinder assembly of an actuator that drives movement of the header 112 or segments of the header 112. The pressure within the cylinder may be indicative of a height of the corresponding section of the header 112 relative to the field (e.g., along the vertical axis). For example, a calibration pressure (e.g., baseline pressure) may be obtained for the cylinder by the pressure sensor, such as while the header 112 is not supported on the ground and is fully supported by the actuator(s). During operation, a reduction in the height of the header 112 relative to the field (e.g., supporting more of or at least some of the header 112 with the ground) may decrease the pressure within the cylinder relative to the calibration pressure. As discussed in more detail below, the pressure within the cylinder as measured by the pressure sensor may be used to adjust the header 112 and/or segments of the header 112 (e.g., by increasing the pressure within the cylinder).

The set of sensors 226 may additionally or alternatively include a contact sensor (e.g., load sensors, ground contact sensors, flex sensors). The contact sensor may extend from the header 112 to contact the field during operation of the harvester, and the contact sensor may monitor a force exerted by the field onto the contact sensor. The exerted force may be indicative of the height of the corresponding section of the header 112 relative to the field (e.g., along the vertical axis 146). For example, reducing the height of the header 112 relative to the field may increase the force detected by the contact sensor, and increasing the height of the header 112 relative to the field may reduce the force detected by the contact sensor. Additionally or alternatively, a movement of the contact sensor may be used to determine the height of the header 112 relative to the field. For instance, the contact sensor may be a flex sensor. In such cases, the force exerted by the field onto the contact sensor may cause the contact sensor to flex or move, and the flexing or movement of the contact sensor may be indicative of the height of the header 112 relative to the field. The contact sensor may additionally or alternatively be positioned on the frame and/or the cutter bar assembly 202. Such embodiments of the contact sensor may monitor an amount of bending of the header 112 (e.g., caused by a force exerted onto the cutter bar assembly 202 to bend the header 112 by the field), and the detected bending may also be indicative of the height of the header 112 relative to the field. In additional or alternative embodiments, at least one of the set of sensors 226 may be a non-contact proximity sensor, such as an infrared sensor, a light detecting and ranging (LIDAR) sensor, an optical sensor, a Hall effect sensor, and the like, configured to measure a distance between the header 112 and the field without contacting the field. In any case, the set of sensors 226 may include any suitable number of sensors (e.g., one or more), which may be the same type or different types of sensors (e.g., multiple pressures for multiple actuators and/or multiple contact sensors for different sections).

Figure 3:
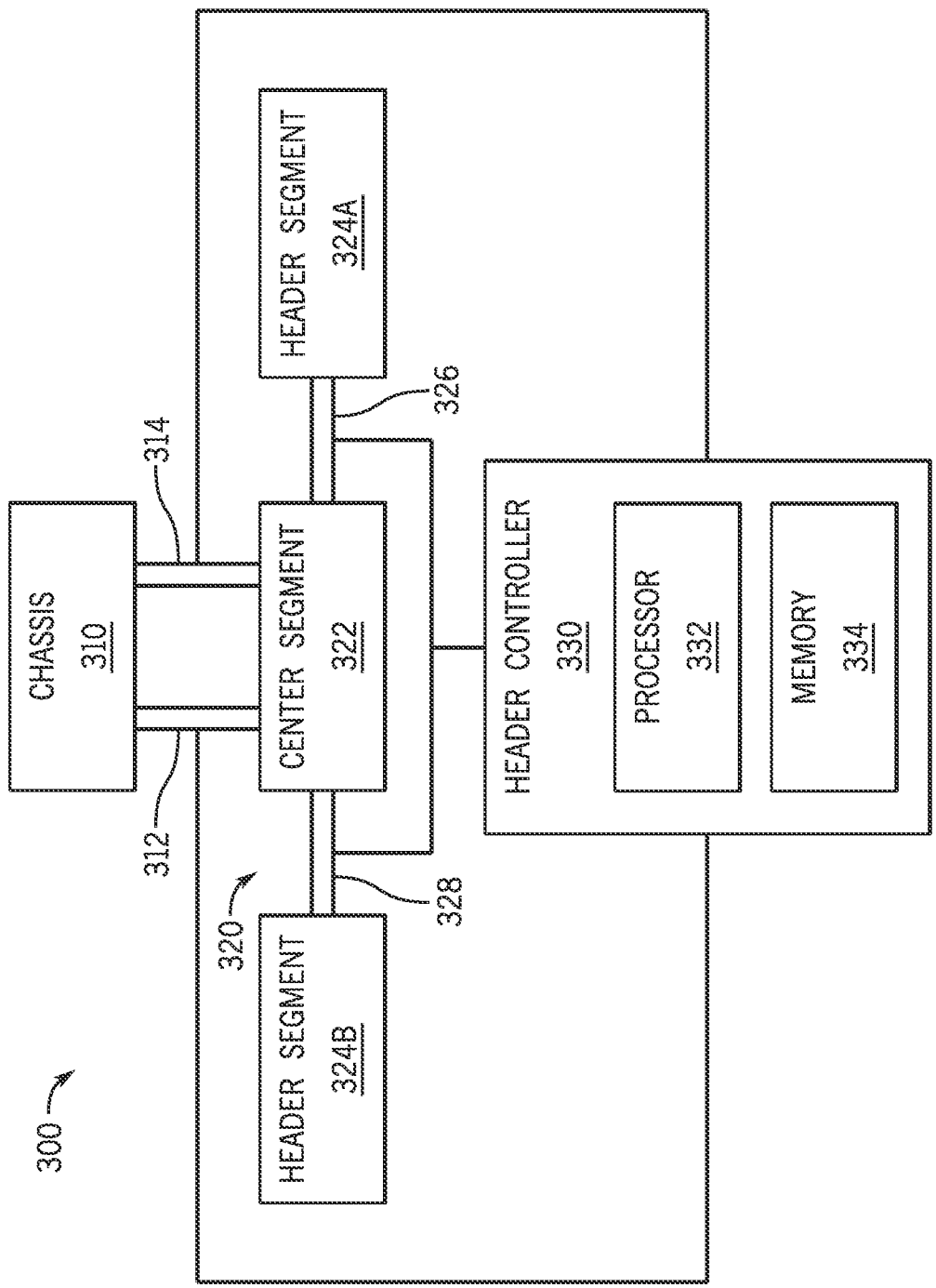
FIG. 3 is a block diagram of a control system that may be used to control a header, such as the header of FIG. 2, in accordance with an embodiment of the present disclosure.

FIG. 3 is a block diagram of a control system 300 that may be used to control a header, such as the header 112 of FIG. 2. The control system 300 includes a header controller 330. The header 320 may include any of the features of the header 112 of FIG. 2, and the header controller 330 may include any of the features of the header controller 224 of FIG. 2. The header controller 330 may include a processor 332 and a memory 334. The header controller 330 may also include one or more storage devices, one or more communication devices, and/or other suitable components. The processor 332 may be used to execute software, such as software for controlling the harvester and/or the header 320 attached to the harvester. Moreover, the processor 332 may include multiple microprocessors, one or more "general-purpose" microprocessors, one or more special-purpose microprocessors, and/or one or more application specific integrated circuits (ASICS), or some combination thereof. For example, the processor 332 may include one or more reduced instruction set (RISC) or complex instruction set (CISC) processors. The memory 334 may include a volatile memory, such as random access memory (RAM), and/or a nonvolatile memory, such as read-only memory (ROM). The memory 334 may store a variety of information and may be used for various purposes. For example, the memory 334 may store processor-executable instructions (e.g., firmware or software) for the processor 332 to execute, such as instructions for controlling the harvester and/or the header 320. The storage device(s) (e.g., nonvolatile storage) may include ROM, flash memory, a hard drive, or any other suitable optical, magnetic, or solid-state storage medium, or a combination thereof. The storage device(s) may store data (e.g., conditions for moving the header 320), instructions (e.g., software or firmware for controlling the header 320), and any other suitable data. The processor 332 and/or memory 334 may be located in any suitable portion of the harvester. By way of example, the header controller 330 may include components (e.g., processors, memory) that are located at the header 320 and/or at the chassis 310 that operate together to carry out the disclosed techniques.

In the illustrated embodiment, the control system 300 includes a first set of actuators 312, 314 extending from the chassis 310 to the center segment 322. The header controller 330 may be communicatively coupled with the first set of actuators 312, 314 and may be configured to output control signals to the first set of actuators 312, 314 to adjust the center segment 322 relative to the chassis 310. As an example, the header controller 330 may output a control signal to instruct a first actuator 312 (e.g., a first subset of actuators of the first set of actuators 312, 314) to raise or lower the center segment 322 relative to the chassis 310, thereby raising or lowering the header 320. As another example, the header controller 330 may output another control signal to instruct a second actuator 314 (e.g., a second subset of actuators of the first set of actuators 312, 314) to tilt the center segment 322 relative to the chassis 310 (i.e., for tilting the header 320 to lower a first lateral end of the center segment 322 along the vertical axis 146 and to raise a second lateral end of the center segment 322 along the vertical axis 146). Furthermore, the control system 300 includes a second set of actuators 326, 328 extending from the center segment 322 to the first and second header segments 324A, 324B, respectively. The header controller 330 may be communicatively coupled with the second set of actuators 326, 328 and may be configured to output control signals to the second set of actuators 326, 328 to adjust the header segments 324A, 324B relative to the center segment 318. By way of example, the header controller 330 may output control signals to a first actuator 326 of the second set of actuators 326, 328 to adjust (e.g., rotate to move toward or away from the ground along the vertical axis 146) the first header segment 324A relative to the center segment 322, and the header controller 330 may output control signals to a second actuator 328 of the second set of actuators 326, 328 to adjust (e.g., rotate to move toward or away from the ground along the vertical axis 146) the second header segment 324B relative to the center segment 322. Although the first set of actuators 312, 314 and the second set of actuators 326, 328 each include two actuators in the illustrated embodiment, the first set of actuators 312, 314 and the second set of actuators 326, 328 may include any number of actuators in alternative embodiments.

In some embodiments, the processor 332 may receive input signals, such as input signals based on an input by a user of the control system 300 of the harvester. For example, the control system 300 may include a user input interface and/or a display. The user input interface may receive the input from the user to operate the harvester. The user input interface may receive an input associated with a set of soil conditions, a set of harvester settings, a set of crop conditions, or any combination thereof. In certain embodiments, the user input interface may be a portion of a display. For example, the user input interface may be a touch screen display. The display may provide an indication of a current operating mode of the harvester and may also provide an indication of the user input received. It should be appreciated that the processor 332 may receive input signals from other sources, such as from sensors of the harvester.

In certain embodiments, the control system 300 may include a set of sensors, such as the set of sensors 226 in FIG. 2. For example, one or more of the actuators 312, 314, 326, 328 may include a piston and cylinder assembly including a pressure sensor to measure cylinder pressure (e.g., pressure within the cylinder). As noted above, the set of sensors may include a contact sensor, a non-contact sensor, or any combination thereof.

During certain operations, the processor 332 may receive and process signals generated by the contact sensor and/or by the non-contact sensor to determine the height of the header 320 (e.g., of each header segment) relative to the ground. The processor 332 may provide control signals to one or more of the actuators 312, 314, 326, 328 based on the height of the header 320 relative to the ground to thereby maintain the header 320 (e.g., each header segment) at a desired position relative to the ground (e.g., to float over the ground without digging into the ground) as the harvester travels through the field. For example, if the signal generated by the contact sensor indicates that the header segment 324A of the header 320 has excessive contact with the ground (e.g., the flex of the flex sensor at the header segment 324A exceeds a flex threshold), the processor 332 may increase the pressure within the cylinder at the header segment 324A to raise the header segment 324A relative to the center segment 322 (e.g., until the flex of the flex sensor at the header segment 324A is within the flex threshold).

During certain operations, the processor 332 may additionally or alternatively receive signals generated by the pressure sensors (e.g., within the cylinders of the actuators 312, 314, 326, 328) to determine the height of the header 320 (e.g., of each header segment) relative to the ground. For example, if the signal generated by the pressure sensor indicates that the header 320 has excessive contact with the ground (e.g., the pressure in the cylinder of the actuator 326 is less than a pressure threshold), the processor 332 may increase the pressure within the cylinder of the actuator 326 to raise the header segment 324A relative to the center segment 322 (e.g., until the pressure matches or exceeds a target pressure, which may be the pressure threshold, the calibration pressure, or some other pressure). The processor 332 may use one or more algorithms to utilize the signals from the pressure sensors in combination with the respective signals from the other sensors (e.g., the contact sensors and/or the non-contact sensors) to control the actuators 312, 314, 326, 328 to maintain the segments 322, 324A, 324B at respective desirable positions relative to the ground.

In some embodiments, the pressure within the cylinder as monitored by the pressure sensor may be used as part of an override protection logic (e.g., secondary protection logic) for the header 320. Thus, the pressure within the cylinder as monitored by the pressure sensor may be used to adjust the header 320 in the absence of and/or regardless of the signals from the other sensors (e.g., even if the other sensor(s), such as the contact sensors and/or non-contact sensors, indicate that no adjustment to the header 320 should be made). For example, even if the flex of the flex sensor is within the flex threshold and indicates that no adjustment to the header 320 should be made, the pressure within the cylinder may be less than the threshold pressure. In such cases, the header controller 330 may execute the override protection logic to increase the pressure within the cylinder to raise the header 320 and/or to raise the corresponding segment of the header 320 (e.g., until the pressure matches or exceeds a target pressure, which may be the pressure threshold, the calibration pressure, or some other pressure).

The processor 332 may access (e.g., from the memory 334) and/or determine the pressure threshold) for the first set of actuators 312, 314 and the second set of actuators 326, 328. In certain embodiments, the threshold may differ between one or more of the actuators. For example, the first set of actuators 312, 314 may have a first pressure threshold and the second set of actuators 326, 328 may have a second pressure threshold. Additionally or alternatively, a pressure threshold for the actuator 326 may differ from a pressure threshold of the actuator 328. Likewise, a pressure threshold for the actuator 312 may differ from a pressure threshold for the actuator 314.

In some embodiments, the processor 332 may use the set of soil conditions to determine the threshold pressure for at least one of the actuators. In certain embodiments, the set of soil conditions may include a firmness of the soil, a composition of the soil, a humidity level of the soil, and/or any other suitable soil conditions. In some embodiments, the processor 332 may use the firmness level of the soil to determine the threshold pressure for at least one of the actuators. For example, a softer soil may have a higher threshold pressure than a harder soil because the softer soil may not produce as high ground contact forces as the harder soil. Additionally or alternatively, the processor 332 may use the set of harvester settings to determine a threshold pressure of at least one of the actuators. In certain embodiments, the set of harvester settings may include a harvesting mode (e.g., on-ground, off-ground), a width of the header 320, a type of header 320, and any other suitable harvester settings. For example, an on-ground harvesting mode may have a lower threshold pressure than an off-ground harvesting mode because the header 320 may be more likely to encounter high ground contact forces during an on-ground harvesting mode. As another example, the threshold pressure may increase as the width of the header 320 increases because of a greater possibility of variations in ground height. Additionally, the threshold pressure may increase as the width of the header 320 increases because of an increase in an overall weight of the header 320 and/or an increase in an overall weight of any header segment. Alternatively, the threshold pressure may decrease as the width of the header 320 decreases because of a decrease in the overall weight of the header 320 and/or a decrease in the overall weight of any header segment. In certain embodiments, the set of crop conditions may be a crop type, a specific crop to be harvested, a humidity level of the crop, and any other suitable crop condition. In certain embodiments, the processor 332 may store the pressure thresholds, the set of soil conditions, the set of harvester settings, and/or the set of crop conditions in the memory 334. In some embodiments, the control system 300 may receive the threshold pressure for one or more of the actuators from a user.

The set of sensors, such as sensors 226 in FIG. 2, may provide feedback to the header controller 330 associated with one or more parameters (e.g., pressure, flex, and/or distance) indicative of the height of the header 320 relative to the ground. The processor 332 may receive the feedback and may compare the one or more parameters to respective threshold(s). The processor 332 may increase the pressure within the cylinder(s) of the actuator(s) to adjust the header 320 and/or the header segments 322, 324A, 324B in the manner discussed herein.

For example, a calibration pressure (e.g., baseline pressure) may be established for the cylinder(s) by using the pressure sensor(s) to obtain and send signals to the processor 332 during a calibration operation, such as while the header 112 is not supported on the ground and is fully supported by the actuator(s). The calibration pressure may be stored in the memory 334. It should be appreciated that a respective, separate calibration pressure may be established for each cylinder of each actuator 312, 314, 326, 328.

The processor 332 may determine the threshold pressure, which may be based on the calibration pressure and/or one or more factors, such as the set of soil conditions, the set of harvester settings, the set of crop conditions, or any combination thereof. For example, the threshold pressure may be a percentage (e.g., 50, 60, 70, 80, or 90 percent of the calibration pressure). Additionally or alternatively, the threshold pressure may vary based on the one or more other factors. Thus, the threshold pressure may be 70 percent of the calibration pressure while the soil is relatively soft and may be 90 percent of the calibration pressure while the soil is relatively hard.

By way of example, in operation, the processor 332 may receive a signal associated with a pressure measurement from the pressure sensor associated with the second header segment 324B (e.g., the pressure within the cylinder of the actuator 328) and compare the pressure measurement to the threshold pressure. In response to determining the pressure measurement is below the threshold pressure, the processor 332 may send instructions to the actuator 328 coupled to the second header segment 324B to adjust a pressure in the actuator 328, and, therefore, a position of the second header segment 324B relative to the ground surface. In certain embodiments, the processor 332 may send instructions to adjust the actuator 328 until the feedback indicates that the pressure matches or exceeds a target pressure, which may be the pressure threshold, the calibration pressure, or some other pressure. For example, the processor 332 may send instructions to adjust the actuator 328 to a pressure above the threshold pressure and proportional to a difference between a feedback amount (e.g., measured pressure) and the threshold pressure.

For example, the threshold pressure may be a first value (e.g., 680 Kilopascal [kPa]) and the feedback amount may be a second value (e.g., 620 kPa). Then, the processor 332 calculate the difference and establish a third value as the target pressure based on the difference (e.g., the difference is 60 kPa, and so the processor 332 may send instructions to adjust the actuator 328 to 740 kPa, which is 60 kPa above the threshold pressure). As another example, the feedback amount may be a fourth value (e.g., 550 kPa) that is less than the second value, and the processor 332 may send instructions to adjust the actuator 328 to a fifth value (e.g., 810 kPa) that is greater than the first value and the third value.

Figure 4:
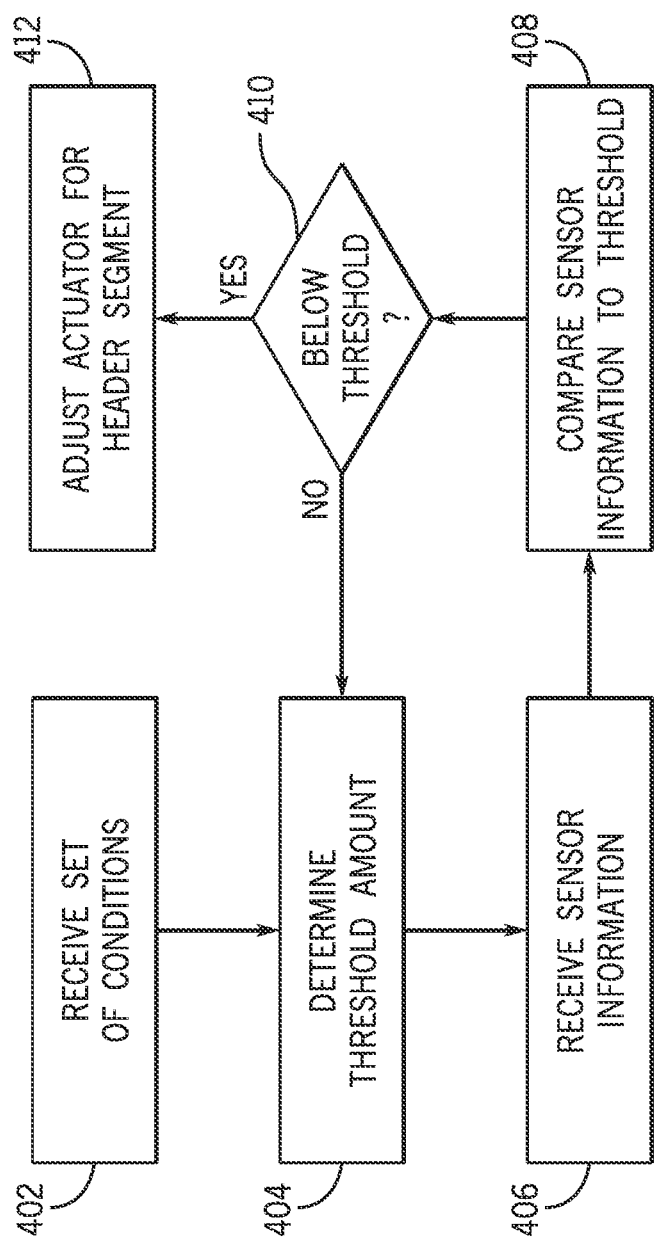
FIG. 4 is a flow diagram of a process for adjusting a position of a header, such as the header of FIG. 2, in accordance with an embodiment of the present disclosure.

FIG. 4 is a flow diagram of a process 400 for adjusting a position of a header, such as the header 112 in FIG. 2 and/or the header 320 in FIG. 3, in accordance with an embodiment of the present disclosure. It should be noted that although the process 400 is described below in a particular order, it should be understood that the process 400 may be performed in any suitable order. Additionally, although the process 400 is described as being performed by the processor 332, any suitable computing device may perform the process 400.

As illustrated in FIG. 4, in certain embodiments, the process 400 may include the processor 332 receiving a set of conditions or factors (step 402) associated with a harvester, such as the harvester 100 in FIG. 1. In some embodiments, the processor 332 may receive the set of conditions from a user input interface. In certain embodiments, the set of conditions may be a set of soil conditions, a set of harvester settings, a set of crop conditions, or any combination thereof. The processor 332 may determine a threshold (step 404) based at least in part on the set of conditions. In some embodiments, the processor 332 may determine a threshold pressure, a flex threshold, a distance threshold, or any combination thereof, based on the set of conditions.

In addition, in certain embodiments, the process 400 may include the processor 332 receiving sensor information (step 406) from a set of sensors, such as the set of sensors 226. For example, the processor 332 may receive sensor information associated with at least one segment of a header. In certain embodiments, the sensor information may include a set of load amounts, a set of pressure amounts, a set of deflection measurements, a set of distance measurements, or any combination thereof.

After receiving the sensor information and determining the threshold(s), the processor 332 may compare the sensor information to the threshold(s) (step 408). For example, the processor 332 may compare a sensed pressure for a first actuator to a threshold pressure for the first actuator. The processor 332 may determine whether the sensed amount falls below the corresponding threshold (step 410). For example, the processor 332 may determine the sensed pressure is 620 kPa for the first actuator while the threshold pressure is 680 kPa for the first actuator. In response to determining the sensed pressure falls below the threshold pressure, the processor 332 may adjust an actuator for a header segment associated with the sensor information. For example, the processor 332 may send a set of instructions to increase a pressure for an actuator at least to the threshold pressure associated with the actuator.

It should be appreciated that any of the features of FIGS. 1-4 may be combined in any suitable manner to enable separate adjustment for each segment of the header to maintain a desirable position of each segment of the header relative to the ground. While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural system, comprising:
    a header comprising a first header segment and a second header segment;
    a first actuator configured to adjust a position of the first header segment relative to the second header segment;
    a second actuator configured to adjust a position of the second header segment relative to the first header segment; and
    a controller that:
        receives sensor information from a first pressure sensor associated with the first actuator and a second sensor associated with the second actuator, the sensor information being indicative of a pressure within a cylinder of the respective actuator;
        compares a first pressure within the cylinder of the first pressure cylinder to a first threshold pressure for the first pressure cylinder;
        sends instructions to the first actuator to adjust the first header segment relative to the second header segment in response to the first pressure being below the first pressure threshold for the first pressure cylinder;
        compares a second pressure within the cylinder of the second pressure cylinder to a second threshold pressure for the second pressure cylinder; and
        sends instructions to the second actuator to adjust the second header segment relative to the first header segment in response to the second pressure being below the second pressure threshold for the second pressure cylinder.

2. The agricultural system of claim 1, wherein the controller
    establishes a calibration pressure, wherein the calibration pressure is a baseline pressure within the cylinder of the first actuator while the header is raised off a ground; and
    determines the first threshold pressure as a percentage of the calibration pressure.

3. The agricultural system of claim 2, wherein the controller is configured to determine the first threshold pressure based on a set of conditions, wherein the set of conditions comprises a set of soil conditions, a set of crop conditions, or any combination thereof.

4. The agricultural system of claim 2, wherein the controller sends the instructions to the first actuator to adjust the first header segment until the first pressure within the cylinder of the first actuator reaches a target pressure.

5. The agricultural system of claim 4, wherein the target pressure comprises the first threshold pressure.

6. The agricultural system of claim 4, wherein the target pressure is greater than the first threshold pressure.

7. The agricultural system of claim 4, further comprising an additional sensor, wherein the controller
    receives additional sensor information from the additional sensor, wherein the additional sensor information is indicative of a position of the first header segment relative to the ground; and
    sends instructions to the first actuator to adjust the first header segment relative to the second header segment based on the additional sensor information.

8. The agricultural system of claim 1, wherein the header comprises a third header segment, and the third header segment is configured to couple to a chassis of a harvester, the first header segment, and the second header segment.

9. The agricultural system of claim 1, comprising a chassis of a harvester, wherein the first header segment is configured to couple to the chassis.

10. A control system, comprising:
    a controller that:
        receives first sensor information from a first sensor associated with a segment of a header, wherein the first sensor information is associated with a deflection measurement of the segment of the header, a load measurement of the segment of the header, a pressure measurement of an actuator associated with the segment of the header, or any combination thereof;
        receives a set of conditions, the set of conditions comprising a set of soil conditions, a set of header conditions for an agricultural system, a set of crop conditions, or any combination thereof;
        determines a threshold pressure associated with the actuator, a threshold load associated with the segment, a threshold deflection associated with the segment, or any combination thereof based on the set of conditions; and
        in response to determining the first sensor information falls below at least one of the threshold pressure, the threshold load, or the threshold deflection, controls the actuator associated with the segment of the header to move the segment of the header relative to another segment of the header;
        receives second sensor information from a second sensor associated with a second segment of the header, wherein the second sensor information is associated with a second deflection measurement of the second segment of the header, a second load measurement of the second segment of the header, a second pressure measurement of a second actuator associated with the second segment, or any combination thereof;
        determines a second threshold pressure associated with the second actuator, a second threshold load associated with the second segment, a second threshold deflection associated with the second segment, or any combination thereof based on the set of conditions; and
        in response to determining the second sensor information falls below at least one of the second threshold pressure, the second threshold load, or the second threshold deflection, controls the second actuator associated with the second segment of the header to move the second segment of the header relative to the first segment of the header.

11. The control system of claim 10, wherein the controller is configured to determine the second threshold pressure associated with the second actuator based on the set of conditions.

12. The control system of claim 10, wherein the second threshold pressure differs from the threshold pressure.

13. The control system of claim 10, wherein the segment is coupled to the second segment.

14. A non-transitory computer readable medium comprising executable instructions that, when executed by a processor, cause the processor to:
receive a set of conditions, the set of conditions including a set of soil conditions, a set of crop conditions, or any combination thereof;
determine a threshold pressure based on the set of conditions;
compare a pressure within a cylinder of an actuator associated with a segment of a header corresponding to the agricultural system to the threshold pressure; and
in response to determining the pressure falls below the threshold pressure, provide a control signal to the actuator to move the segment of the header relative to another segment of the header.

15. The non-transitory computer readable medium of claim 14, wherein the instructions, when executed by the processor, further cause the processor to:
establish a calibration pressure, wherein the calibration pressure is a baseline pressure within the cylinder of the actuator while the header is raised off a ground; and
determine the threshold pressure as a percentage of the calibration pressure.

16. The non-transitory computer readable medium of claim 14, wherein the set of soil conditions comprises a firmness of a soil, a humidity level of the soil, a composition of the soil, or any combination thereof.

17. The non-transitory computer readable medium of claim 14, wherein the set of header conditions comprises a width of the header, an operating mode of the header, or any combination thereof.

18. The non-transitory computer readable medium of claim 14, wherein the executable instructions, when executed by the processor, cause the processor to provide the control signal to increase the pressure within the cylinder above the threshold pressure.

* * * * *